United States Patent
Kennedy et al.

(10) Patent No.: US 9,177,272 B2
(45) Date of Patent: Nov. 3, 2015

(54) METHOD AND SYSTEM OF OBTAINING DIAGNOSTIC DATA FROM A DEVICE AT A REMOTE LOCATION

(75) Inventors: Allan R. Kennedy, Centerville, OH (US); James D. Barton, Centerville, OH (US); Jeffrey J. Davison, Dayton, OH (US)

(73) Assignee: NCR Corporation, Duluth, GA (US)

( * ) Notice: Subject to any disclaimer, the term of this patent is extended or adjusted under 35 U.S.C. 154(b) by 1034 days.

(21) Appl. No.: 12/342,908

(22) Filed: Dec. 23, 2008

(65) Prior Publication Data

US 2010/0161343 A1  Jun. 24, 2010

(51) Int. Cl.
| | | |
|---|---|---|
| *G06Q 40/00* | (2012.01) | |
| *G06Q 10/06* | (2012.01) | |
| *G06Q 10/00* | (2012.01) | |
| *G06Q 20/04* | (2012.01) | |
| *G06Q 20/10* | (2012.01) | |

(52) U.S. Cl.
CPC ............... *G06Q 10/06* (2013.01); *G06Q 10/20* (2013.01); *G06Q 20/1085* (2013.01); *G06F 2201/86* (2013.01); *G06F 2201/88* (2013.01); *G06Q 20/04* (2013.01); *G06Q 20/108* (2013.01); *G06Q 40/00* (2013.01)

(58) Field of Classification Search
CPC ..... G06Q 40/00; G06Q 20/04; G06Q 20/108; G06Q 10/20; G06Q 20/1085; G06F 2201/86; G06F 2201/88
USPC ........................ 705/43, 35; 235/379, 375, 380
See application file for complete search history.

(56) References Cited

U.S. PATENT DOCUMENTS

| | | | | |
|---|---|---|---|---|
| 6,953,150 | B2* | 10/2005 | Shepley et al. | 235/379 |
| 7,051,096 | B1* | 5/2006 | Krawiec et al. | 709/223 |
| 7,281,040 | B1* | 10/2007 | Ly | 709/224 |
| 7,545,816 | B1* | 6/2009 | Coutts et al. | 370/400 |
| 8,317,087 | B1* | 11/2012 | Crews et al. | 235/379 |
| 8,474,693 | B1* | 7/2013 | Myana et al. | 235/379 |
| 2004/0129772 | A1* | 7/2004 | Ramachandran et al. | 235/379 |

(Continued)

OTHER PUBLICATIONS

NCR analyst day—final. (Dec. 2, 2004). Fair Disclosure Wire Retrieved from http://search.proquest.com/docview/465865036?accountid=14753 on Jun. 23, 2015.*

(Continued)

*Primary Examiner* — Kito R Robinson
(74) *Attorney, Agent, or Firm* — Schwegman, Lundberg & Woessner (57) ABSTRACT

A system and method of obtaining diagnostic data from a device at a remote location in one embodiment includes establishing a communications link between a service location and a customer location remote from the service location, transmitting first diagnostic data from a device at the customer location over the communications link, receiving the first diagnostic data at the service location, generating an action request at the service location in response to the received first diagnostic data, transmitting the action request to the customer location, receiving the action request at the customer location, authorizing the received action request, obtaining second diagnostic data associated with the action request from the device, and transmitting the second diagnostic data to the service location.

9 Claims, 8 Drawing Sheets

(56) References Cited

U.S. PATENT DOCUMENTS

| | | | |
|---|---|---|---|
| 2004/0173671 A1* | 9/2004 | Ferraro | 235/379 |
| 2009/0083182 A1* | 3/2009 | Coventry et al. | 705/43 |
| 2009/0204856 A1* | 8/2009 | Sinclair et al. | 714/48 |
| 2012/0166491 A1* | 6/2012 | Angus et al. | 707/802 |
| 2012/0194319 A1* | 8/2012 | Kang et al. | 340/5.52 |

OTHER PUBLICATIONS

Card briefs: Bank of N.H. using more MAC services. (Nov. 6, 1995). American Banker (Pre-1997 Fulltext) Retrieved from http://search.proquest.com/docview/292977167?accountid=14753 on Jun. 23, 2015.*

* cited by examiner

METHOD AND SYSTEM OF OBTAINING DIAGNOSTIC DATA FROM A DEVICE AT A REMOTE LOCATION

BACKGROUND

Electronic terminals are well known by customers. For example, some electronic terminals may print or dispense items of value such as coupons, tickets, wagering slips, vouchers, checks, food stamps, money orders, or traveler's checks. Another common type of electronic terminal enables bank customers to engage in banking transactions without the assistance of a banking representative. These types of terminals are referred to an automated teller machines ("ATM").

The types of transactions an ATM can perform are determined by the hardware and software capabilities of the specific machine. In particular, most ATMs enable customers to withdraw cash, deposit funds, transfer funds between accounts, and pay bills, without the assistance of a customer representative. For purposes of this disclosure, references to an ATM, an automated banking machine, or automated transaction machines shall encompass any electronic terminal, which carries out customer transactions.

Automatic teller machines typically include a card reader, a personal identification pad, a vault, a cash dispenser, a receipt provider, and a central processing unit or computer. To begin a transaction, a user inserts an identification card into the card reader and enters his or her personal identification number ("PIN") on the identification pad. The computer within the ATM verifies the accuracy of the PIN through an electronic network. If the user enters the correct PIN and the account is in good standing, the ATM completes the transaction(s) initiated by the user.

Like all computer controlled machines, ATMs may not function properly even though the user has inserted his or her identification card and provided the correct PIN. For example, the ATM may experience hardware problems if the cash dispenser or receipt provider were to become jammed or if an optical sensor in the identification card reader were to become dirty. Additionally, some ATMs may experience software problems or faults, much like personal computers often do, that prevent users from initiating transactions. When problems or faults arise, the ATM may enter a stand-by mode that denies users access to the machine. Clearly, when in stand-by mode, ATMs become a source of frustration for operating organizations and the customers desiring to utilize the machines.

Traditionally, when an ATM experiences a problem or fault, a bank representative places a telephone call or sends an electronic message to a remotely located servicing organization indicating that the ATM has experienced a technical problem. After receiving the message, an in-house technician at the terminal monitoring solution may dispatch a field technician to inspect the faulty ATM. Upon arriving at the faulty ATM, the field technician issues diagnostic commands to the ATM computer that generate data representative of the fault or faults experienced by the machine, referred to as log and tally information. If the generated data is succinct, the field technician telephones the terminal monitoring solution and verbally communicates the data to an in-house technician. If, however, the data generated by the ATM is not succinct, the field technician records the data in electronic form, usually on a floppy diskette, travels back to the terminal monitoring solution, and hand delivers the diskette to an in-house technician for analysis. After analyzing the diagnostic data, the in-house technician instructs the field technician on how to clear the fault from the ATM. Of course, the field technician must once again travel back to the ATM in order to complete the corrective action.

Sending field technicians to nonfunctional ATMs consumes vast amounts of time and resources, and is extremely prone to error, especially when field technicians must verbally communicate fault data to in-house technicians. Furthermore, as the use of ATMs and other electronic terminals becomes more prolific, the number of problems and faults to which field technicians must attend is likely to increase. Thus, the traditional method of responding to ATM faults is destined to become an even greater expense and burden for ATM operating and servicing organizations.

Therefore, a need exists for improved methods for identifying ATM faults. A system and method of identifying problems from a remote location would be beneficial. A system and method which allows identification of ATM problems without transferring sensitive customer data to a remote location would be further beneficial.

SUMMARY

In order to address the above described needs, a system and method of obtaining diagnostic data from a device at a remote location in one embodiment includes establishing a communications link between a service location and a customer location remote from the service location, transmitting first diagnostic data from a device at the customer location over the communications link, receiving the first diagnostic data at the service location, generating an action request at the service location in response to the received first diagnostic data, transmitting the action request to the customer location, receiving the action request at the customer location, authorizing the received action request, obtaining second diagnostic data associated with the action request from the device, and transmitting the second diagnostic data to the service location.

In another embodiment, a system for obtaining diagnostic data from a device at a remote location includes an automated teller machine (ATM), the ATM configured to transmit first data associated with an event of the ATM over a communications link, a service server at a location remote from the ATM, the service server operably connected to the communications link, the service server configured to (i) receive the first data, (ii) format a first action request, and (iii) transmit the first action request over the communications link, and a customer server operably connected to the communications link, the customer server configured to (i) determine that the first action request does not violate a predetermined set of restrictions, (ii) generate a signal resulting in performance of the first action request, and (iii) transmit data associated with performance of the first action request to the service server.

In a further embodiment, a method of obtaining diagnostic data from a device at a remote location includes establishing a communications link between a customer server and a service server at location remote from the customer server, generating an action request with the service server, transmitting the action request to the customer server, receiving the transmitted action request, determining that the received action request does not violate a predetermined set of restrictions, generating a control signal based upon the received action request, controlling an ATM to perform the action request, obtaining diagnostic data associated with performance of the action request, and transmitting the diagnostic data to the service server.

DETAILED DESCRIPTION

For the purposes of the present disclosure, an automatic teller machine ("ATM") is described. It is understood, however, that the concepts disclosed herein can be applied to other types of electronic terminals, such as but not limited to, self checkout terminals, bill payment kiosks, and the like, in which a customer executes a series of steps to complete a transaction.

Figure 1:
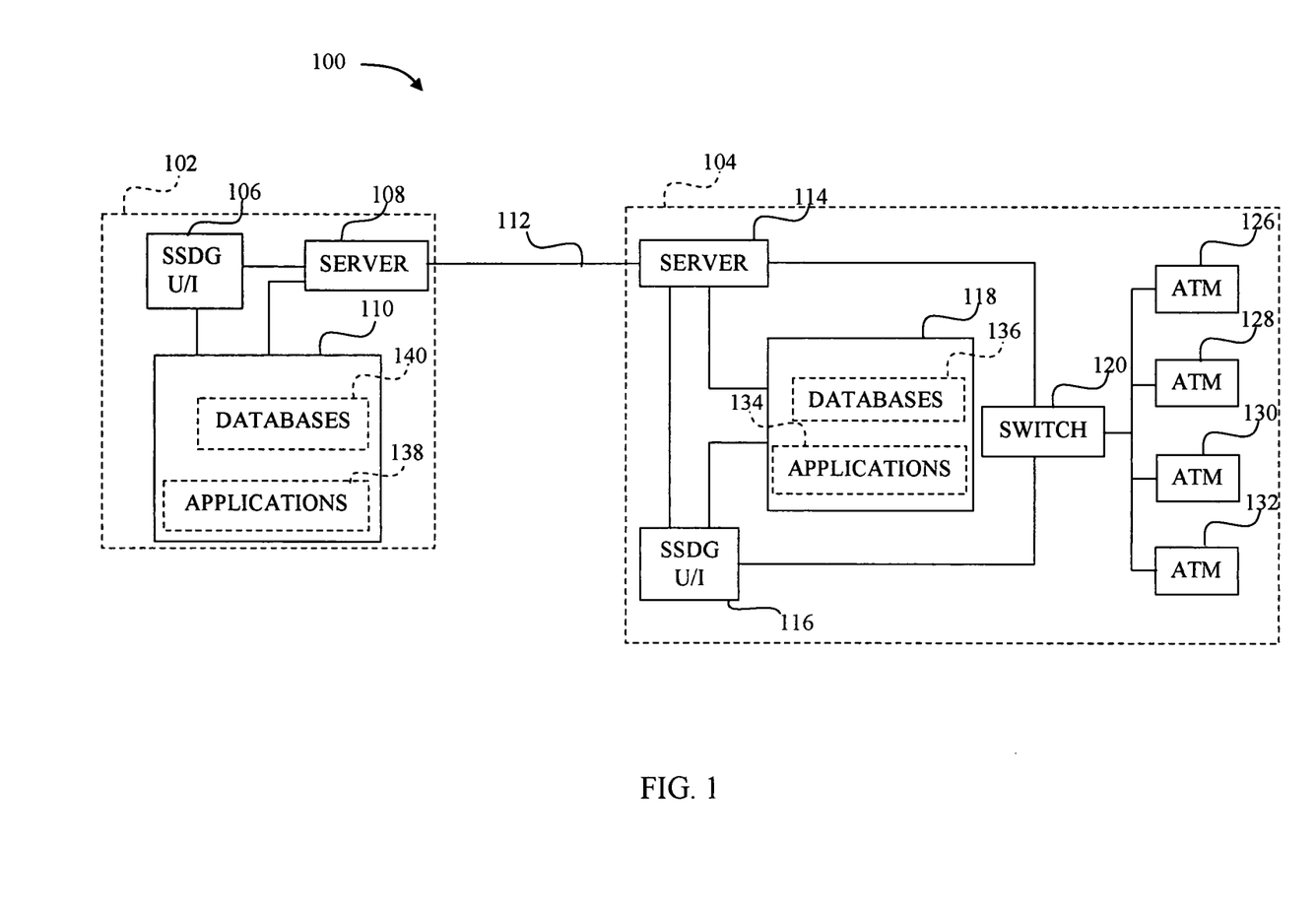
FIG. 1 depicts, in block diagram form, a system for performing diagnostics on a device at a customer location, as disclosed herein.

FIG. 1 depicts a self-service diagnostic system 100 that includes a servicing location 102 and a customer location 104 remote from the servicing location 102. The servicing location 102 includes a user interface (U/I) 106 that is operably connected to a server 108 and a memory 110. While the U/I 106, the server 108 and the memory 110 are depicted as located at a common location, one or more of the U/I 106, the server 108 and the memory 110 may be positioned at a location remote from the other of the U/I 106, the server 108 and the memory 110. In such embodiments, communication between the components may be established permanently or temporarily in, for example, a wide area network (WAN) or a local area network (LAN), using an acceptable protocol such as transmission control protocol and internet protocol ("TCP/IP").

The servicing location 102 is connected to the customer location 104 by a communications link 112. The communications link 112 represents any type of wired or wireless electronic communications system such as the Internet, a wide area network, or a small area network. The communications link 112 extends between the server 108 and a server 114 located at the customer location 104. In one embodiment, firewalls are provided within each of the server 108 and the server 114.

The customer location 104 further includes a user interface (U/I) 116 that is operably connected to the server 114. Both of the U/I 116 and the server 114 are connected to a customer memory 118 and a switch 120. The switch 120 is, in turn, communicably connected to four automatic teller machines (ATMs) 126, 128, 130, and 132.

Although only one customer location 104 is depicted in FIG. 1, additional customer locations (not shown) may be incorporated into the diagnostic network 100. Each of these additional customer locations may have one or more ATMs. Additionally, while the ATMs 126, 128, 130, and 132 are shown at a single customer location 104, each of the ATMs 126, 128, 130, and 132 may be positioned at locations remote from the other of the ATMs 126, 128, 130, and 132 as well as at a location remote from the other components of the customer location 104 so long as the components are configured to be electronically networked to the communications link 112.

The ATMs 126, 128, 130, and 132 in this embodiment are configured with a Simple Network Management Protocol (SNMP) agent. In one embodiment, the agent is an APTRA SNMP agent, commercially available from NCR Corporation of Dayton, Ohio. The agent allows files to be retrieved from the ATMs 126, 128, 130, and 132 remotely. These files may include diagnostic logs.

The switch 120 monitors the ATMs 126, 128, 130, and 132 for events which may include fault conditions. The switch 120 is programmed with various rules which are used to analyze event data from the ATMs 126, 128, 130, and 132 and provide customized notifications. The notifications may be provided to different service providers depending upon the nature of the event and the time of day. The switch 120 may be configured with a VANTAGE service manager commercially available from NCR Corporation of Dayton, Ohio. In alternative embodiments, the switch 120 may be modified for use with other communication protocols, including transmission control protocol and internet protocol ("TCP/IP").

Once installed, the SNMP manager in the switch 120 automatically determines the type of hardware and software operating on the ATMs 126, 128, 130, and 132. Specifically, the SNMP manager determines which data collection programs or agents are installed on each of the ATMs 126, 128, 130, and 132. When new agents, commands, hardware, or software are added to the ATMs 126, 128, 130, and 132, the SNMP manager may be electronically updated to respond to the new types of faults, errors and other events that the new or updated agents may detect.

The switch 120 interfaces with the U/I 116 which may be configured with a monitoring application. One such application monitors changes in the status of the ATMs 126, 128, 130, and 132. Such monitoring may include identifying the operational status of the ATMs 126, 128, 130, and 132, and cash and receipt paper status. The monitoring application in this embodiment is configured to provide an automated, intelligent response, based on a combination of knowledge base and customer-specific business rules. In this embodiment, the application may suitably be a GASPER VANTAGE application commercially available from NCR Corporation of Dayton, Ohio. The monitoring application may be stored as one of the applications 134 in the memory 118 and data generated by the monitoring application may be stored in one of the databases 136 within the memory 118.

The U/I 116 may include an operating system such as, but not limited to, Microsoft Windows XP Professional and Microsoft Windows 2003 Server Edition. The U/I 116 allows a user to monitor the components of the customer location 104. Accordingly, the user can check the status of the ATMs 126, 128, 130, and 132, initiate service dispatches, issue ATM commands, update service provider contact information and view reports. If desired, the U/I 116 may be used to remotely access the components of the customer location 104. In one embodiment, the U/I 116 includes a VANTAGE browser, commercially available from NCR Corporation of Dayton, Ohio.

The server 114 provides bi-directional communication between the switch 120, the U/I 116, and the server 108. The server 114 is configured to receive file transfer requests. File transfer requests are assessed by the server 114 according to restrictions established at the user location. In one embodiment, the restrictions are stored in one or more of the customer databases 136 and may only be modified through the U/I 116 which may be password protected.

The restrictions may be in the form of a list of data requests received by the server 114 which are allowed to be passed to the switch 120. If desired, all data requests may be disabled by appropriate commands issued from the U/I 116. Alternatively, data requests, or a subset of data requests, received by the server 114 may be routed to the U/I 116 for authorization prior to being passed to the switch 120. Similarly, any data transmitted from the customer location 104 may be analyzed to ensure that sensitive data is not transmitted onto the communication link 112. The restrictions may further include scheduling restrictions. For example, file retrieval activities may only be allowed at certain times of day and/or on certain days of the week. Thus, the customer can manage ATM availability.

The server 114 is further configured to log all data requests received to one of the databases 136. If desired, a copy of all data transmitted pursuant to a request received by the server 114 may also be stored in one of the databases 136. This data may be encrypted, unencrypted, and/or password protected. The data logged may include an identification of the ATM, the identification of the user requesting the file, the fully qualified file name, the request status (e.g., pending until <time>, Rejected or Complete), the date and time the request was received, the date and time the file was retrieved, and the size of the data transferred.

In the event the customer authorizes sensitive information to be transmitted pursuant to a request received by the server 114, the server 114 may be configured to encrypt the sensitive data prior to transmission. In one embodiment, data transmitted pursuant to a request is packaged in a file with a timestamp, the request ID, the actual request and response data. A hash is also created on the data and included in the file so the receiver can validate that the response has not been changed by an unauthorized third party.

The server 108 provides bi-directional communication between the server 108 and the U/I 106. The server 108 is configured to perform file transfer request administrative functions in response to file requests received from the U/I 106. If desired, the server 108 may be configured, along with the server 114, to provide encrypted communications between the servicing location 102 and the customer location 104. The server 108 is further configured to parse incoming messages from the server 114 as discussed in further detail below.

The U/I 106 may include an operating system such as, but not limited to, Microsoft Windows XP Professional and Microsoft Windows 2003 Server Edition. The U/I 106 allows a user to access applications 138 stored in the memory 110 and to access data stored within databases 140 stored in the memory 110. In one embodiment, the U/I 106 includes a browser similar to the VANTAGE browser, commercially available from NCR Corporation of Dayton, Ohio. The browser is further modified, however, to allow file transfer requests to be issued as discussed below.

Figure 2:
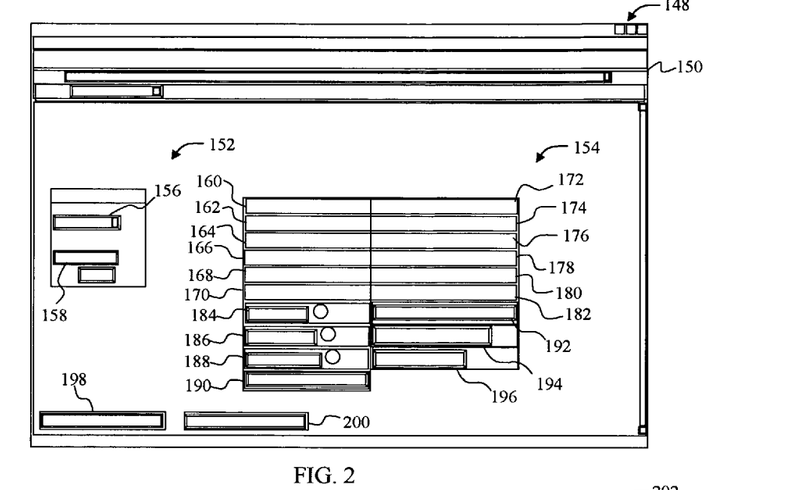
FIG. 2 depicts an exemplary screen from which a user remote from a device may issue an action request.

In one embodiment, for example, the U/I 106 is configured to render the window 148 of FIG. 2. The window 148 includes a navigation portion 150 as is known. The window 148 further includes a quick navigation pane 152 and an action request pane 154. The quick navigation pane 152 is used to identify the particular one of the ATMs 126, 128, 130, or 132 from which a user desires to obtain information. A drop down window 156 is used to identify an existing maintenance ticket number associated with a particular one of the ATMs 126, 128, 130, or 132 while a user field 158 is used to type in the identification of one of the ATMs 126, 128, 130, or 132.

The action request pane 154 includes a number of title fields 160, 162, 164, 166, 168, and 170. The title fields 160, 162, 164, 166, 168, and 170 identify predetermined data fields used to identify one of the ATMs 126, 128, 130, or 132. In one embodiment, the fields 160, 162, 164, 166, 168, and 170 are titled "Manufacturer", "Product/Model", "Platform Version", "Serial Number", "Install Date", and "Application State", respectively.

In response to identification of one of the ATMs 126, 128, 130, or 132 in the quick navigation pane 152, the relevant data associated with the title fields 160, 162, 164, 166, 168, and 170 is presented in the ATM specific fields 172, 174, 176, 178, 180, and 182. This data may be obtained from the databases 140 in the memory 110. In alternative embodiments, some or all of the data may be obtained from the customer location 104 in near real time. By way of example, the ATM specific field 182 used to display the application state of the ATM may be obtained from the customer location 104 pursuant to a data action request.

The action request pane 154 also includes a number of buttons 184, 186, 188, 190, 192, and 194. The buttons 184, 186, 188, 190, 192, and 194 are used to request specific actions associated with the identified ATM. In one embodiment, the buttons 184, 186, 188, 190, 192, and 194 are used to obtain detailed information about a device log, a communications log, a software log, a windows event log, summary data, and a detailed device and module data, respectively of the identified ATM. Also present on the window 148 are a license update request button 196, an ATM reset request button 198 and a device reset request dropdown button 200. If desired, the layout of the window 148 may be modified. Selection of each of the buttons 184, 186, 188, 190, 192, 194, 196, 197, 198, and 200 is described below.

Selection of the button 184 causes a drop down box (not shown) to be rendered identifying each of the devices associated with the identified ATM which, for purposes of this example, is ATM 126. By highlighting the desired device, a device log window 202 (FIG. 3) is rendered. The window 202 includes the quick navigation window 152 and a device log area 204 which includes a number selection window 206 and a retrieve button 208. The selection window 206 is used to identify the number of device logs to be requested, which may include all available logs. The retrieve button 208 is an action request button which is used to request data to populate the device log area 204.

Figure 4:
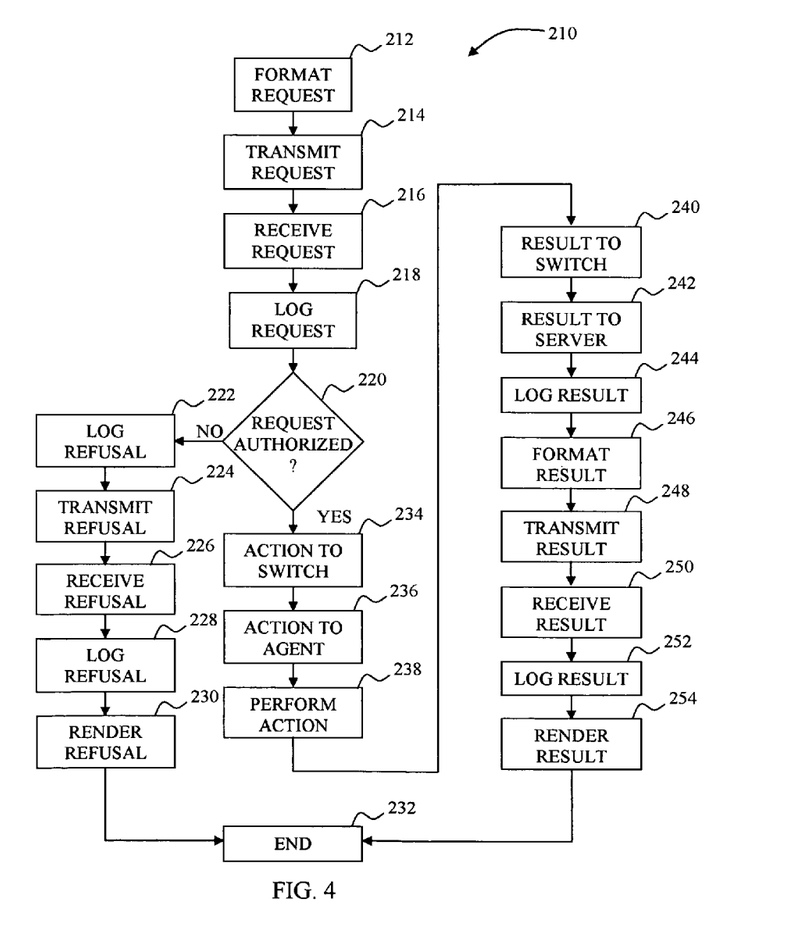
FIG. 4 depicts a process flowchart illustrating a procedure for requesting an action from a device at a remote customer location utilizing the system of FIG. 1.

Specifically, in response to a user selection of an action request button such as the retrieve button 208, a request procedure 210 depicted in FIG. 4 is initiated. The U/I 106 passes the request associated with the retrieve button 208 to the server 108 which formats the request using a file transfer protocol (block 212). Formatting of the request includes providing a unique request identification and the unique identification of the user issuing the request. The identity of the user may be established, for example, by use of a logon and password at the U/I 106. If desired, the request may be encrypted by the server 108.

Once the request has been formatted, the request is transmitted to the server 114 (block 214) which receives the request (block 216) and decrypts the transmission if necessary. In one embodiment, the server 114 is configured to accept up to one polling or action request per second. The server 114 then logs the details of the request (block 218) in the memory 118. The information logged may include the date and time of the request, the identification of the user making the request, the action requested, etc. The server 108 then evaluates the request to ascertain whether or not the request complies with rules established by the user (block 220).

The rules may identify particular times during which particular requested actions are not allowed, the amount of data that can be transmitted, particular data which cannot be obtained, and other restrictions. The restrictions may be categorized by security levels. For example, the server 114 may be controlled by at least two levels of security access. One level of security access, termed administrator access, permits a user to access each of the configurable files of the server 114.

A second and more limited level of security access, termed non-administrator access, permits users to access a configurable portion of the communication and diagnostic capabilities of the server 114. Users with administrator access may determine the access level of other non-administrative users. The server 114 may apply rules to require all action requests to include a username and password to access or poll the server 114. Furthermore, separate passwords may be defined for the at least two levels of security.

If any rule is not met for undertaking the requested action, the server 114 determines that the request is not authorized by the customer and logs a refusal of the request (block 222). The logged refusal includes the date and time of the refusal along with the rule or rules which were not met. If the refusal is based upon an attempt to utilize the server 114 in a manner inconsistent with the level of security of the user, the server 114 may record the username of the party making the request, if one is available, as well as details about the origin of the request, including but not limited to, the internet protocol address of the computer making the request and the time and date the request was made. It should also be noted, that as a further security measure, the server 114 may be configured to log all or substantially all activities undertaken by the server 114 in the memory 118.

The server 114 also formats and transmits a refusal message (block 224) to the server 108. The server 108 receives the refusal message (block 226). The refusal message is stored in the memory 110 (block 228) and analyzed by the server 108. Since the response is a refusal of an action request initiated by the U/I 106, the refusal message is transmitted to the U/I 106 which issued the request. The U/I 106 renders the refusal message (block 230) and the request process ends (block 232).

In the event the action request met all of the rules (block 220), the server 114 authorizes the action request and passes the action to the switch 120 (block 234). The switch 120 parses the action message and generates the appropriate command which is transmitted to the agent (block 236) residing on the ATM identified in the window 148 (FIG. 2), which, for purposes of this example, is ATM 126. The agent on the ATM 126 then executes the action (block 238). The action may be one which entails obtaining data already residing in the ATM 126. Alternatively, the action may entail performing an action to generate data. By way of example, a device may be recycled to clear a jam and, subsequently, perform a self-test, the results of which are recorded.

In any event, once the action is performed, the agent transmits data associated with the requested action to the switch 120 (block 240). The switch 120 reformats the results data and transmits the results data to the server 114 (block 242). The server 114 logs the results data to the memory 118 (block 244) and formats the results data into a packet for transmission to the server 108 (246). Because the action undertaken had already been assessed to be authorized, the outgoing message may not be further analyzed for compliance with restrictions stored in the memory 118. Alternatively, all transmissions may be assessed prior to transmission regardless of prior analysis. The results data packet is then transmitted to the server 108 (block 248).

Upon receipt of the results data packet (block 250), the server 108 logs the results data into the memory 110 (block 252) and analyzes the message. Since the data packet is a response to an action request initiated by the U/I 106, the data packet is transmitted to the U/I 106 which issued the request. The U/I 106 then renders the results data (block 254) and the process ends (block 232).

Returning to FIG. 3, in the event the selection of the button 184 generated an action request that was authorized, the procedure 210 would result in rendering of device log entries 260. The device log entries 260 in this embodiment are rendered in a table 262 that includes columns 264, 266, 268, 270, and 272. The columns 264, 266, 268, 270, and 272, which may be labeled, are used to render values for the device name, service name, transaction code, severity code, and MData, respectively. Additional data may be provided, including the date and time of the log entry, and a description of any condition initiating the log entry. The data retrieved are thus a function of the action request and the rules established in the memory 118 by the customer and can vary among embodiments.

Returning to FIG. 3, selection of the button 186 causes a drop down box (not shown) to be rendered identifying each of the components associated with communications for the ATM 126. By highlighting the desired component, a component log window 300 (FIG. 5) is rendered. The window 300 includes the quick navigation window 152 and a communications log area 302 which includes a number selection window 304 and a retrieve button 306. The selection window 304 is used to identify the number of communication logs to be requested, which may include all available logs. The retrieve button 306 is an action request button which is used to request data to populate the communications log area 302.

Figure 5:
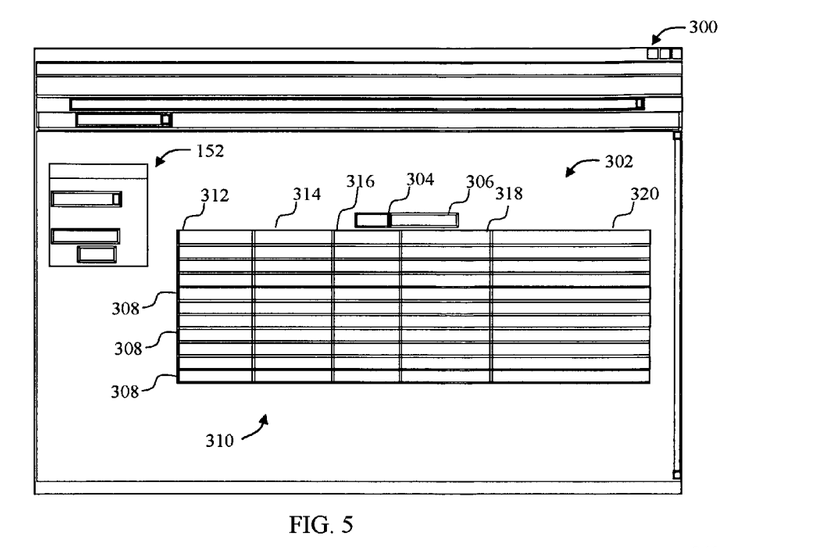
FIG. 5 depicts an exemplary screen which may be rendered including data obtained from a remote device pursuant to a communications log action request.

Selection of the button 306 generates an action request that, if authorized, results in rendering of communication log entries 308. The communication log entries 308 in this embodiment are rendered in a table 310 that includes columns 312, 314, 316, 318, and 320. The columns 312, 314, 316, 318, and 320, which may be labeled, are used to render values for the device name, service name, transaction code, severity code, and MData, respectively. Additional data may be provided, including the date and time of the log entry, and a description of any condition initiating the log entry. The data retrieved are thus a function of the action request and the rules established in the memory 118 by the customer and can vary among embodiments.

Returning to FIG. 3, selection of the button 188 causes a drop down box (not shown) to be rendered identifying each of the software sequences associated with the ATM 126. By highlighting the desired software sequence, a software sequence log window 340 (FIG. 6) is rendered. The window 340 includes the quick navigation window 152 and a software sequence log area 342 which includes a number selection window 344 and a retrieve button 346. The selection window 344 is used to identify the number of software sequence logs to be requested, which may include all available logs. The retrieve button 346 is an action request button which is used to request data to populate the software sequence log area 342.

Figure 6:
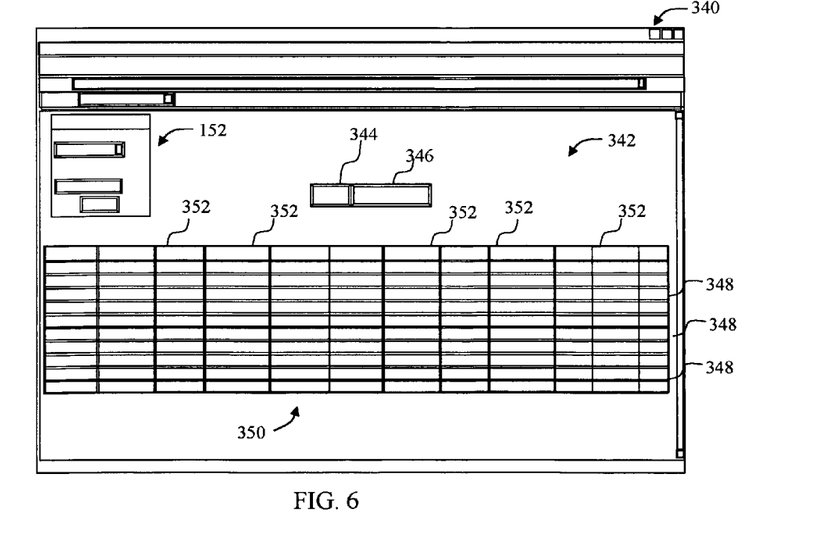
FIG. 6 depicts an exemplary screen which may be rendered including data obtained from a remote device pursuant to a software sequence action request.

Selection of the button 346 generates an action request that, if authorized, results in rendering of software sequence log entries 348. The software sequence log entries 348 in this embodiment are rendered in a table 350 that includes columns 352. The columns 352, which may be labeled, may be used to render, for example, the sequence, the date and time of the event, the line number involved, the source name, the process name, the thread name, the DLL name, an event identification, a level, a reason, binary data, and a cause. The data retrieved are thus a function of the action request and the rules established in the memory 118 by the customer and can vary among embodiments.

Returning to FIG. 3, selection of the button 190 causes a drop down box (not shown) to be rendered identifying windows event logs associated with the ATM 126. The logs in one embodiment include a system log, a security log, and an application log. By highlighting the system log, a system log window 360 (FIG. 7) is rendered. The window 360 includes the quick navigation window 152 and a system log area 362 which includes a number selection window 364 and a retrieve button 366. The selection window 364 is used to identify the number of system logs to be requested, which may include all available logs. The retrieve button 366 is an action request button which is used to request data to populate the system log area 362.

Figure 7:
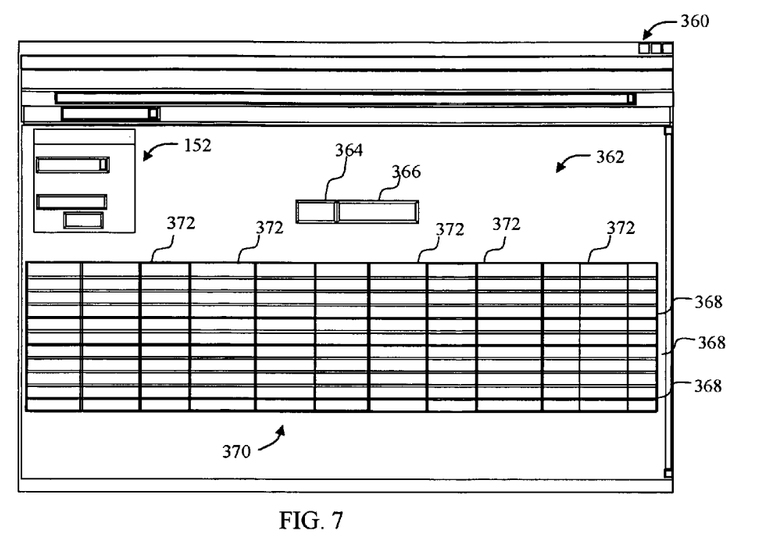
FIG. 7 depicts an exemplary screen which may be rendered including data obtained from a remote device pursuant to a system log action request.

Selection of the button 366 generates an action request that, if authorized, results in rendering of system log entries 368. The system log entries 368 in this embodiment are rendered in a table 370 that includes columns 372. The columns 372, which may be labeled, may be used to render, for example, the sequence, the date and time of the event, the user involved, the ATM identification, the event identification, the source, the event type, the category of the event, a description of the event, and other data. The data retrieved are thus a function of the action request and the rules established in the memory 118 by the customer and can vary among embodiments.

By selection of the button 190 and highlighting the security log, a security log window 380 (FIG. 8) is rendered. The window 380 includes the quick navigation window 152 and a security log area 382 which includes a number selection window 384 and a retrieve button 386. The selection window 384 is used to identify the number of security logs to be requested, which may include all available logs. The retrieve button 386 is an action request button which is used to request data to populate the security log area 382.

Figure 8:
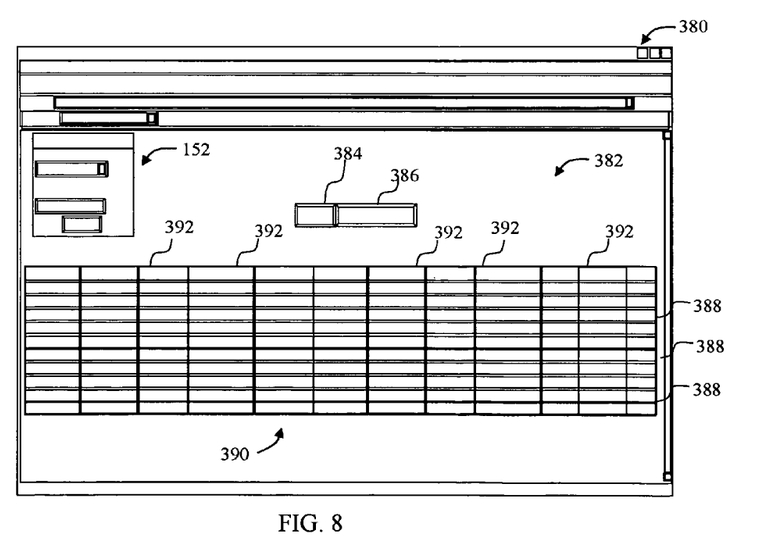
FIG. 8 depicts an exemplary screen which may be rendered including data obtained from a remote device pursuant to a security log action request.

Selection of the button 386 generates an action request that, if authorized, results in rendering of security log entries 388. The security log entries 388 in this embodiment are rendered in a table 390 that includes columns 392. The columns 392, which may be labeled, may be used to render, for example, the sequence, the date and time of the event, the user involved, the ATM identification, the event identification, the source, the event type, the category of the event, a description of the event, and other data. The data retrieved are thus a function of the action request and the rules established in the memory 118 by the customer and can vary among embodiments.

By selection of the button 190 and highlighting the application log, an application log window 400 (FIG. 9) is rendered. The window 400 includes the quick navigation window 152 and an application log area 402 which includes a number selection window 404 and a retrieve button 406. The selection window 404 is used to identify the number of application logs to be requested, which may include all available logs. The retrieve button 406 is an action request button which is used to request data to populate the application log area 402.

Figure 9:
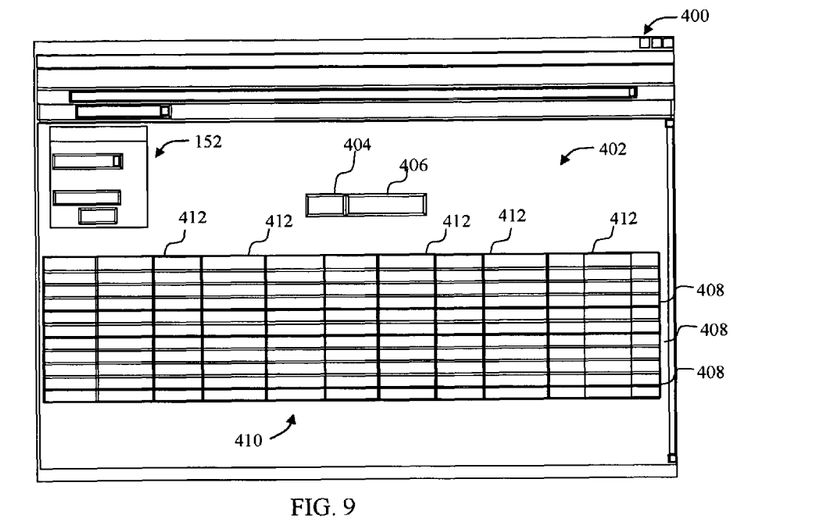
FIG. 9 depicts an exemplary screen which may be rendered including data obtained from a remote device pursuant to an application log action request.

Selection of the button 406 generates an action request that, if authorized, results in rendering of application log entries 408. The application log entries 408 in this embodiment are rendered in a table 410 that includes columns 412. The columns 412, which may be labeled, may be used to render, for example, the sequence, the date and time of the event, the user involved, the ATM identification, the event identification, the source, the event type, the category of the event, a description of the event, and other data. The data retrieved are thus a function of the action request and the rules established in the memory 118 by the customer and can vary among embodiments.

The summary data button 192 is an action request button which is configured to retrieve a predetermined set of data. In this embodiment, selection of the summary data button 192 generates an action request that, if authorized, results in rendering of window 420 shown in FIG. 10. The window 420 includes folders 422 which are summaries of other action requests. In this embodiment, the folders 422 include an information folder 424, an application information folder 426, a device log folder 428, a software log 430, a component state folder 432, and a service state table 434.

Figure 10:
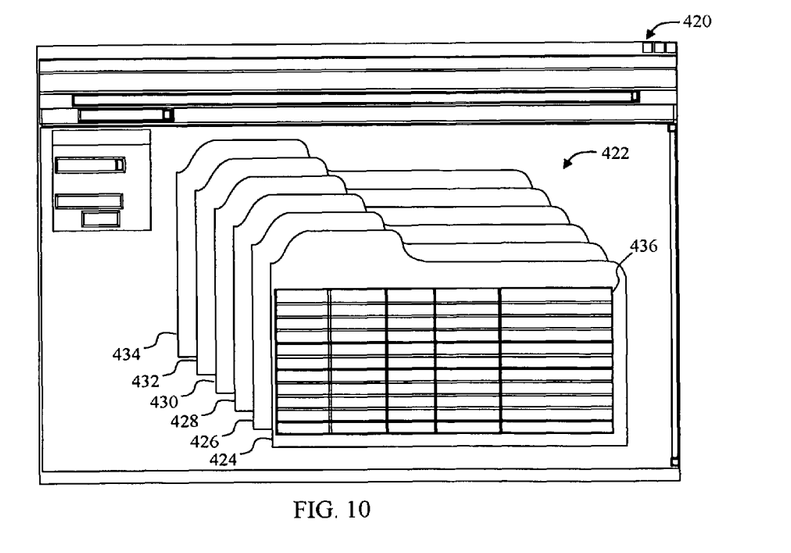
FIG. 10 depicts an exemplary screen which may be rendered including data obtained from a remote device pursuant to a summary data action request.

Each of the folders 422 includes a predetermined set of data which is rendered. The information folder 424, for example, includes a table 436 which identifies the ATM 126 manufacturer, model number, serial number, installation date, last service date, and an aggregate module state. The data presented in the application folder 426 may include identity of the manufacturer, the product name, the version, and the installation date of the application.

Figure 3:
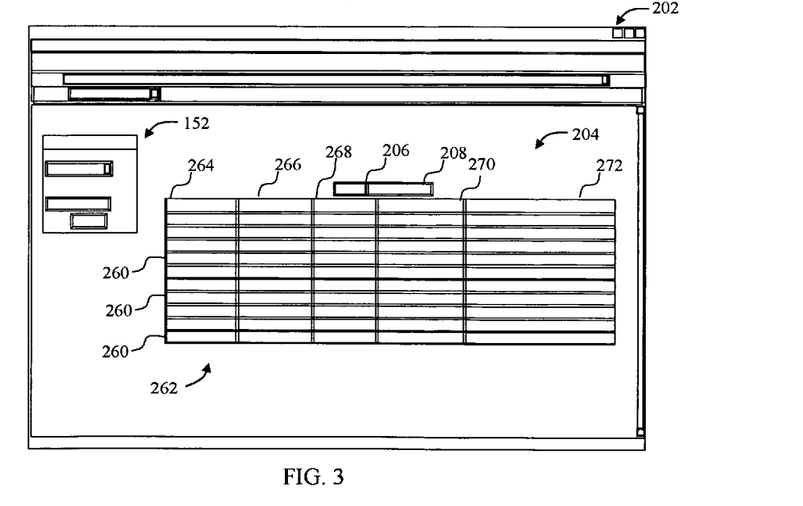
FIG. 3 depicts an exemplary screen which may be rendered including data obtained from a remote device pursuant to a device log action request.

The data presented in the device log folder 428 may be a predetermined number of log entries similar to the log entries 260 of FIG. 3. The data presented in the software log folder 430 may be a predetermined number of log entries similar to the log entries 350 of FIG. 6.

The component state table folder 432 may be configured to render a component state description, a component state category, a component state code, a component state date and time stamp, a component state device and other component state data. In one embodiment, the component state data for each device on the ATM 126 is rendered. Additionally, the service state table folder 434 may be configured to render service state state, service state information, service state date and time, service state service, and service state data.

The detailed device and module data button 194 is an action request button which is also configured to retrieve a predetermined set of data. In this embodiment, selection of the detailed device and module data 194 generates an action request that, if authorized, results in rendering of window 440 depicted in FIG. 11. The window 440 includes folders 442 which are summaries of various action requests. In this embodiment, the folders 442 include a component state folder 444, a device attributes folder 446, a device service data folder 448, a device tally data folder 450, a model attributes folder 452, and a module action data folder 454.

Figure 11:
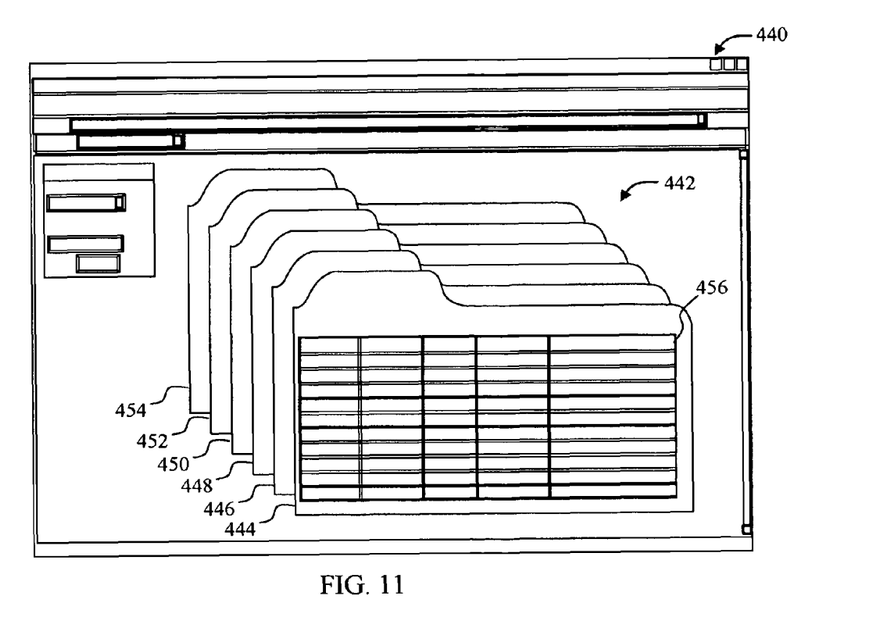
FIG. 11 depicts an exemplary screen which may be rendered including data obtained from a remote device pursuant to a detailed device and module data action request.

Each of the folders 442 includes a predetermined set of data which is rendered. The component state table folder 444, for example, includes a table 456 which includes a component state description, a component state category, a component state code, a component state date and time stamp, a component state device and other component state data. In one embodiment, the component state data for each device on the ATM 126 is rendered.

The device attributes folder 446 may be configured to render data for the selected device including the manufacturer, the installation data, the name of the device, a short description of the device, a long description of the device, a universal identification, a variant, and a summary state.

The device service data folder 448 may be configured to render data for the selected device including service index data, service variant data, service state, maintenance data and replenishment data.

The device tally data folder 450 may be configured to render data for the selected device including index data, tally name data, and tally value data.

The model attributes folder 452 may be configured to render data for the selected device including identifier data, description data, replenishable data, summary state data, detailed state data, and detailed state description data.

The module action data folder 454 may be configured to render data for the selected device including action description data, fault detection data, proactive action data, proactive detection data, and customer actionable data.

The license request button 196 is an action request button which is configured to request that the server 114 be configured to enable all access capabilities with no expiration date. In this embodiment, selection of the license request button 196 generates an action request that, if authorized, results in an SNMP license key stored within the memory 118 to be set. Accordingly, upon transmission to the server 114, the action request is routed by the server 114 to the U/I 116. If authorized by a user with a proper security level at the U/I 116, an appropriate rule is stored in the memory 118. A message may be returned to the U/I 106 indicating that the action request has been authorized.

Returning again to FIG. 3, the ATM recycle button 198 is an action request button. In this embodiment, selection of the ATM recycle button 198 generates an action request that the ATM 126 be rebooted. Accordingly, upon transmission to the server 114, the action request is evaluated by the server 114. If authorized by an appropriate rule stored in the memory 118, the server 114 generates a message to the switch 120 which in turn controls the rebooting of the ATM 126.

Once the ATM 126 has rebooted, a message may be returned to the U/I 106 indicating that the action request has been completed in accordance, for example, with the procedure 210. Additional data obtained after the reboot indicating whether or not the reboot was successful may also be routed to the U/I 106.

The device reset button 200 is a drop down button. Upon selection, a list of devices on the ATM 126 is rendered. By selecting once of the rendered devices, an action request is initiated requesting that the selected device be recycled. Accordingly, upon transmission to the server 114, the action request is evaluated by the server 114. If authorized by an appropriate rule stored in the memory 118, the server 114 generates a message to the switch 120 which in turn controls the recycling of the selected device through the agent of the ATM 126.

Once the device has been recycled, a message may be returned to the U/I 106 indicating that the action request has been completed in accordance, for example, with the procedure 210. Additional data obtained after the recycling event indicating whether or not the recycling of the device was successful may also be routed to the U/I 106.

In alternative embodiments, some of the above described action requests may not be authorized. In such embodiments, the action request button associated with the action request may not be rendered. Additionally, other action requests may be included as options.

Figure 12:
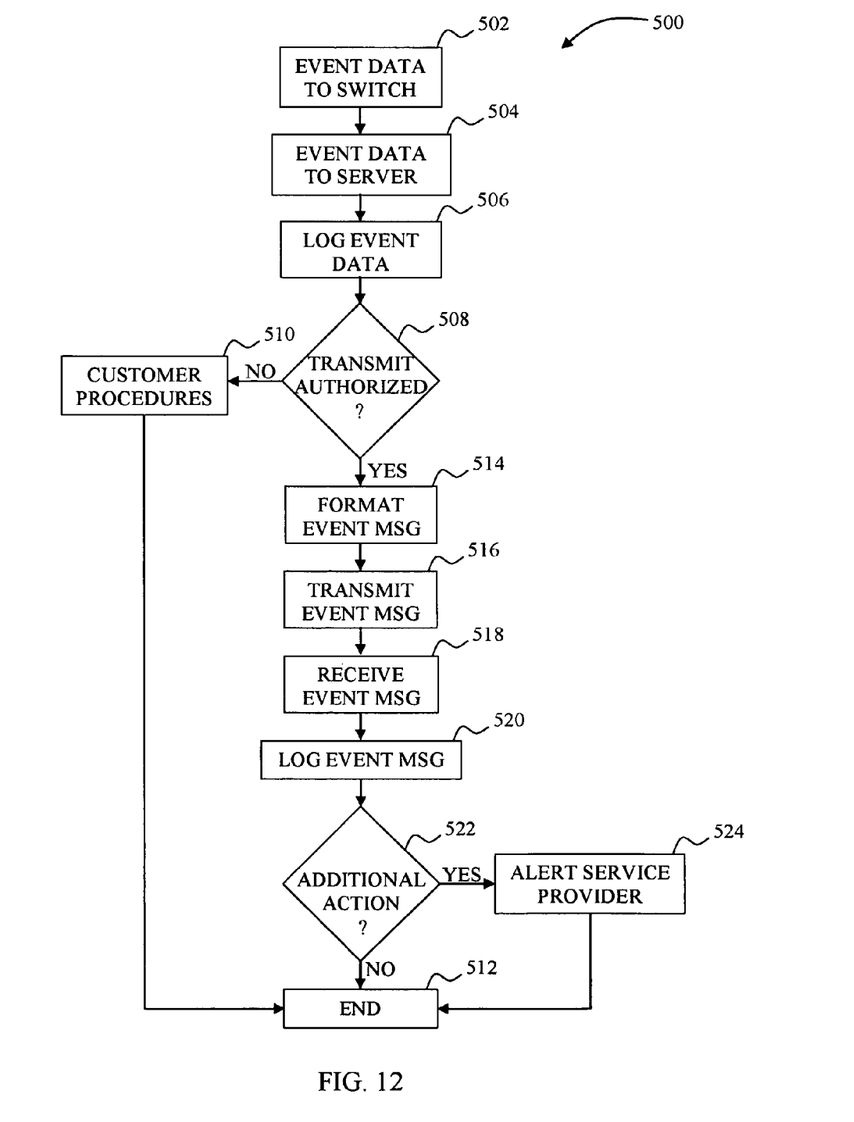
FIG. 12 depicts a process flowchart illustrating an event processing procedure for processing events at a device at a remote customer location utilizing the system of FIG. 1.

The system 100 may be operated in accordance with the procedure 500 depicted in FIG. 12. In most circumstances, the ATMs 126, 128, 130, and 132 operate without events including faults or errors and the switch 120 simply monitors the agents installed on each of the ATMs 126, 128, 130, and 132. The switch 120 may be configured to monitor each agent continuously, or as configured by the U/I 116, the switch 120 may periodically query the ATMs 126, 128, 130, and 132 for status. An exemplary period may have a duration of approximately thirty seconds to two minutes.

If an event occurs, the agent on the relevant ATM, which in this example is the ATM 126, generates a message to the switch 120 that an event has occurred. The event may be a hardware fault, a software fault, depletion of a replenishable item, or a predetermined amount of time or number of operations. The switch 120 parses the data generated by the ATM 126. By parsing the data, the switch 120 determines which device or component is associated with the event, the time and date of the event, the severity of the event, and how many times the same event has occurred in the current calendar day. The switch 120 transmits the parsed data to the server 114 (block 504).

The server 114 "packages" the parsed information in a file suitable for logging and logs the package into the memory 118 (block 506). The server 114 may compile and retain entries in the memory 118 indefinitely or the server 114 may purge entries of a specified age. For example, all log entries older than the specified age of sixty days might be purged from the memory 118. Additionally, logged data may be accessible through the U/I 118 and the U/I 106 by users with an appropriate security access.

The server 114 then analyzes the packaged data (block 508). In the event the data does not meet pre-established rules for transmission to the servicing location 102, the procedure 500 continues in accordance with customer procedures (block 510). For example, transmission of packaged data may only be allowed if the number of events for a particular device or component exceeds a predetermined threshold number of event in a given period. An exemplary predetermined threshold may be five events within a twenty-four hour time period. Other rules include those previously discussed. Depending upon the customer procedures (block 510) additional actions may be conducted and then the procedure 500 ends (block 512).

If the packaged data, either solely or in combination with other logged data, meets the rules established at the customer location 104 for transmission (block 508), then the packaged data is prepared for transmission to the server 108 (block 514). Such preparation may include encryption. The packaged data is then transmitted to the server 108 over the communications link 112 (block 516).

The transmitted packaged data is received by the server 108 (block 518) and decrypted as necessary. The received data is then logged into the memory 110 (block 520) and analyzed for further action (block 522). The server 108 analyzes the data received from the server 114 according to rules stored in the memory 110. If, based upon the analysis, no further action is required (block 522), then the procedure ends (block 512). By way of example, events such as an empty cash drawer, an empty receipt printer, or the conduct of normally scheduled maintenance by the customer may be logged without any further action required.

In some circumstances, however, additional data may be required to fully understand the event initiating the event reporting sequence or some servicing location 102 initiated action may be implicated. In these circumstances, an alert is issued to the servicing location (block 524). The alert may be in the form of an audible alarm, an indicator at the U/I 106, or another method. The procedure 500 then ends (block 512).

In the event an alert was generated (block 524), the servicing location 102 can initiate an action request pursuant, for example, the procedure 210. Based upon the data received pursuant the procedure 500, a technician at the servicing location 102 may determine that the type of event exhibited by the ATM 126 is a fault having a known corrective action, which can be remotely performed. Typical faults that may be remotely corrected without any local human intervention include physically recycling the ATM 126 using button 198 and recycling an affected device within the ATM 126 using the button 200.

In other situations, the technician may determine that data in addition to the data transmitted pursuant to the procedure 500 is needed prior to deploying a technician to the user location 104, or recycling the ATM 126 or a device associated with the ATM 126. Accordingly, the procedure 210 may be used to obtain additional data from the ATM 126.

The system 100 thus allows a technician at the servicing location 100 to obtain data to better understand the event which initiated the event reporting sequence. Based upon the data, the technician may identify a faulted hardware device or software component, identify a procedure for resolving a fault condition, instruct a technician at the user location 104 on how to correct a fault, or identify a required field technician skill level if a field technician is required to repair the fault.

Thus, the information gathered by the system 100 and rendered at the U/I 106 eliminates wasted resources resulting from a field technician traveling to a faulted terminal, issuing commands to diagnose a fault, and relaying the fault information back to the servicing location 102. Additionally, by electronically sending event data from the ATM to the servicing location 102, communication errors resulting from the verbal transmission of fault data may be completely eliminated. Furthermore, because the server 114 automatically signals the server 108 when events occur, the ATMs 126, 128, 130, and 132 are less likely to progress to a faulted condition. Additionally, in the event of a fault, the ATMs 126, 128, 130, and 132 may be more rapidly returned to service.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A multiple-server arrangement for processing diagnostic data associated with a plurality of automated teller machines (ATMs) in which each ATM has a corresponding ATM controller which is connectable through an ATM switch to the multiple-server arrangement, the multiple-server arrangement comprising:

a first hardware server located at a customer location and operatively connectable through the ATM switch to each of the plurality of ATM controllers of the plurality of ATMs;

a first user interface operatively connected to the first hardware server and for allowing a user at the customer location to monitor components of the customer location;

a second hardware server located at a servicing location which is remote from the customer location and operatively connectable over a communications link to the first hardware server located at the customer location; and a second user interface operatively connected to the second hardware server and for allowing a user at the servicing location to make an action request for desired ATM diagnostic data from a desired ATM controller of the plurality of ATMs, wherein (i) the action request is transmitted from the second hardware server over the communications link to the first hardware server (ii) the first hardware server evaluates the action request from the second hardware server based upon a predetermined set of restriction rules stored in a database associated with the first hardware server to determine if the action request is authorized to be passed through the ATM switch to the desired ATM controller, and (iii) the first hardware server passes the action request through the ATM switch to the desired ATM controller if the action request has been authorized by the first hardware server to do so, wherein the action is selected by the user as a software sequence from a list presented in the second user interface, wherein the list presents software sequences associated with the desired ATM.

2. A multiple-server arrangement according to claim 1, wherein (i) the first user interface located at the customer location comprises a first browser, and (ii) the second user interface located at the servicing location comprises a second browser.

3. A multiple-server arrangement according to claim 1, wherein at least some of the stored predetermined set of restriction rules comprises scheduling restrictions which allow an action request to be processed only during certain times of day and/or on certain days of the week.

4. A multiple-server arrangement according to claim 1, wherein at least some of the stored predetermined set of restriction rules comprises data transmission restrictions which ensure that sensitive ATM diagnostic data is not transmitted from the customer server to the remote servicing server.

5. A multiple-server arrangement according to claim 1, wherein at least some of the stored predetermined set of restriction rules are categorized by security levels.

6. A multiple-server arrangement according to claim 1, wherein at least some of the stored predetermined set of restriction rules comprises a list of data requests which are allowed to be passed to the ATM switch.

7. A multiple-server arrangement according to claim 1, wherein at least some of the stored predetermined set of restriction rules comprises scheduling restrictions which allow an action request to be processed only during certain times of day and/or on certain days of the week.

8. A multiple-server arrangement according to claim 1, wherein at least some of the stored predetermined set of restriction rules comprises data transmission restrictions which ensure that sensitive ATM diagnostic data is not transmitted from the customer server to the remote servicing server.

9. A multiple-server arrangement according to claim 1, wherein at least some of the stored predetermined set of restriction rules are categorized by security levels.

* * * * *